United States Patent
Abe et al.

(10) Patent No.: US 11,620,089 B2
(45) Date of Patent: Apr. 4, 2023

(54) NON-VOLATILE STORAGE OF HIGH RESOLUTION TAPE DIRECTORY

(71) Applicant: International Business Machines Corporation, Armonk, NY (US)

(72) Inventors: Atsushi Abe, Ebina (JP); Tsuyoshi Miyamura, Yokohama (JP); Setsuko Masuda, Toshima-ku (JP)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 17/102,607

(22) Filed: Nov. 24, 2020

(65) Prior Publication Data
US 2022/0164110 A1    May 26, 2022

(51) Int. Cl.
*G06F 3/06* (2006.01)

(52) U.S. Cl.
CPC .......... *G06F 3/0682* (2013.01); *G06F 3/0611* (2013.01); *G06F 3/0643* (2013.01); *G06F 3/0644* (2013.01); *G06F 3/0653* (2013.01)

(58) Field of Classification Search
None
See application file for complete search history.

(56) References Cited

U.S. PATENT DOCUMENTS

| | | | |
|---|---|---|---|
| 6,463,513 B1 * | 10/2002 | Bish | G06F 12/0866 707/999.01 |
| 6,571,304 B1 * | 5/2003 | Basham | G06F 3/0617 360/132 |
| 9,021,175 B2 | 4/2015 | Butt et al. | |
| 10,199,068 B2 | 2/2019 | Abe et al. | |
| 2006/0176602 A1 * | 8/2006 | Honjo | G11B 15/07 360/69 |
| 2009/0109571 A1 | 4/2009 | Hood | |
| 2014/0078609 A1 | 3/2014 | Ballard | |
| 2014/0108720 A1 | 4/2014 | Abe | |
| 2015/0127616 A1 | 5/2015 | Hasegawa | |
| 2019/0371364 A1 | 12/2019 | Hasegawa et al. | |
| 2019/0385641 A1 | 12/2019 | Hasegawa et al. | |

FOREIGN PATENT DOCUMENTS

JP    2014-081988 A    5/2014

OTHER PUBLICATIONS

International Search Report and Written Opinion for Application PCT/IB2021/060172, dated Feb. 10, 2022, 9 pages.

* cited by examiner

*Primary Examiner* — Charles J Choi
(74) *Attorney, Agent, or Firm* — Scott S. Dobson

(57) ABSTRACT

An HRTD stored in the volatile memory of a tape drive is communicated for storage in an off-tape non-volatile memory prior to unloading a tape cartridge. In response to the tape cartridge being loaded into the tape drive, the HRTD is received from the off-tape non-volatile memory.

20 Claims, 6 Drawing Sheets

NON-VOLATILE STORAGE OF HIGH RESOLUTION TAPE DIRECTORY

BACKGROUND

The present disclosure relates to tape-based data storage, and more specifically, to High Resolution Tape Directory (HRTD) for a tape-based data storage.

Linear tape-open (LTO) tape drives and IBM enterprise tape drives (TS11xx) are called linear tape drives. A linear tape drive allocates data on a tape in a longitudinal direction and records the data from the beginning of the tape to the end, then shifts the position slightly in the lateral direction of the tape, and then records data to the tape in the opposite longitudinal direction. The linear tape drive repeats this reciprocating operation several times with shifting in the lateral direction of the tape.

In the event of receiving a seek command, it is not a simple process for the tape drive to move to the physical position of the target record. For example, when storing 10 TB of data as 128 KB records, 40,000,000 records are necessary, and it is impossible to record the physical positions of all the records. In addition, unlike hard disk drives (HDDs), it is generally possible for a tape device to modify the record length of each record. For this reason, the physical positions cannot be determined with a simple calculation formula.

A seek operation includes moving the tape to the beginning of the area where the target record is present and reading records from the beginning of the area until the target record is reached. Information about the area read during the seek operation is accumulated in the volatile memory of the tape drive. This area information table is called High Resolution Tape Directory (HRTD). The HRTD can be used to improve seek times for records that included in the HRTD.

TS11xx drives store the HRTD in a management area of the tape when writing records. However, in the case of an LTO drive, as the use of the management area of a tape is strictly defined by the LTO format specification, the HRTD is not allowed to be stored on the tape. Therefore, the LTO drive discards the HRTD in the volatile memory of the drive when unloading the tape cartridge. For this reason, compared to TS11xx tape drives, LTO tape drives are generally slower in seeking a record that has not been accessed since the cartridge has been loaded into the tape drive.

SUMMARY

According to embodiments of the present disclosure, a method is provided. The method includes reading a tape directory from a cartridge memory of a tape cartridge in a first tape drive. The method further includes seeking a target record using the tape directory. Physical positions of a plurality of different records that have been read during the seeking are stored in a volatile memory of the first tape drive as a high resolution tape directory (HRTD). The HRTD stored in the volatile memory is communicated for storage in an off-tape non-volatile memory prior to unloading the tape cartridge. In response to the tape cartridge being loaded into the tape drive, the HRTD is received from the off-tape non-volatile memory. The method allows maintaining the HRTD to potentially increase seeking speed where the HRTD would otherwise have been discarded.

Optionally, when the off-tape non-volatile memory is part of a tape library, the method further includes exporting the HRTD from the off-tape non-volatile memory in response to the tape cartridge being removed from the tape library. This may allow the tape library to free storage space for other uses while maintaining the HRTD.

Optionally, when the off-tape non-volatile memory is part of a tape library, the method furthers include discarding the HRTD in the off-tape non-volatile memory based on the tape cartridge being removed from the tape library. This may allow the tape library to free storage space for other users. Optionally, the discarding is further based on a specified period of time elapsing since the tape cartridge was removed from the tape library. This may allow the HRTD to maintained for a period of time after the tape cartridge is removed while still allowing the tape library to free up storage space.

Optionally, the method further includes generating a hash code using tape specific information, where the hash code is communicated with the HRTD for storing in the off-tape non-volatile memory. This may allow the HRTD to subsequently be verified to determine if it is valid for a tape cartridge. Optionally, when the hash code is received with the HRTD from the off-tape non-volatile memory, the method further includes verifying the hash code using tape specific information from the tape cartridge. This may prevent an invalid HRTD from being used based on a tape cartridge that does not correspond to the HRTD or a tape that has been written to subsequent to the creation of the HRTD.

According to embodiments of the present disclosure, a tape drive is provided. The tape drive includes a memory including a volatile memory and a controller coupled to the memory. The controller is configured to perform operations from the method described above.

According to embodiments of the present disclosure, a system is provided. The system includes a memory containing program instructions and a processor coupled to the memory. The processor is configured to execute the instructions to perform operations including: in response to receiving a tape cartridge eject request for a tape cartridge in a tape drive, requesting a high resolution tape directory (HRTD) from a volatile memory of the tape drive, and in response to receiving the HRTD from the tape drive, storing the HRTD in a non-volatile memory. The system allows for maintaining the HRTD where the HRTD would otherwise have been discarded.

Optionally, the operations further include receiving a tape cartridge insert request for inserting the tape cartridge into the tape drive and sending the HRTD stored in the non-volatile memory to the tape drive. This may allow the tape drive to perform faster seeking using the HRTD.

According to embodiments of the present disclosure, a tape library is provided. The tape library includes a memory including a non-volatile memory and a controller coupled to the memory, the controller configured to perform operations including in response to receiving a tape cartridge eject request for a tape cartridge in a tape drive, requesting a high resolution tape directory (HRTD) from a volatile memory of the tape drive, and in response to receiving the HRTD from the tape drive, storing the HRTD in the non-volatile memory. The tape library allows for maintaining the HRTD where the HRTD would otherwise have been discarded.

Optionally, the operations further include receiving a tape cartridge insert request for inserting the tape cartridge into the tape drive and sending the HRTD stored in the non-volatile memory to the tape drive. This may allow the tape drive to perform faster seeking using the HRTD.

Optionally, the operations further include discarding the HRTD in response to the tape cartridge being removed from the tape library and determining that remaining free storage capacity in the non-volatile memory is below a threshold value. This may allow the tape library to maintain the HRTD when the tape cartridge has been removed while allowing the tape library to free storage space when needed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
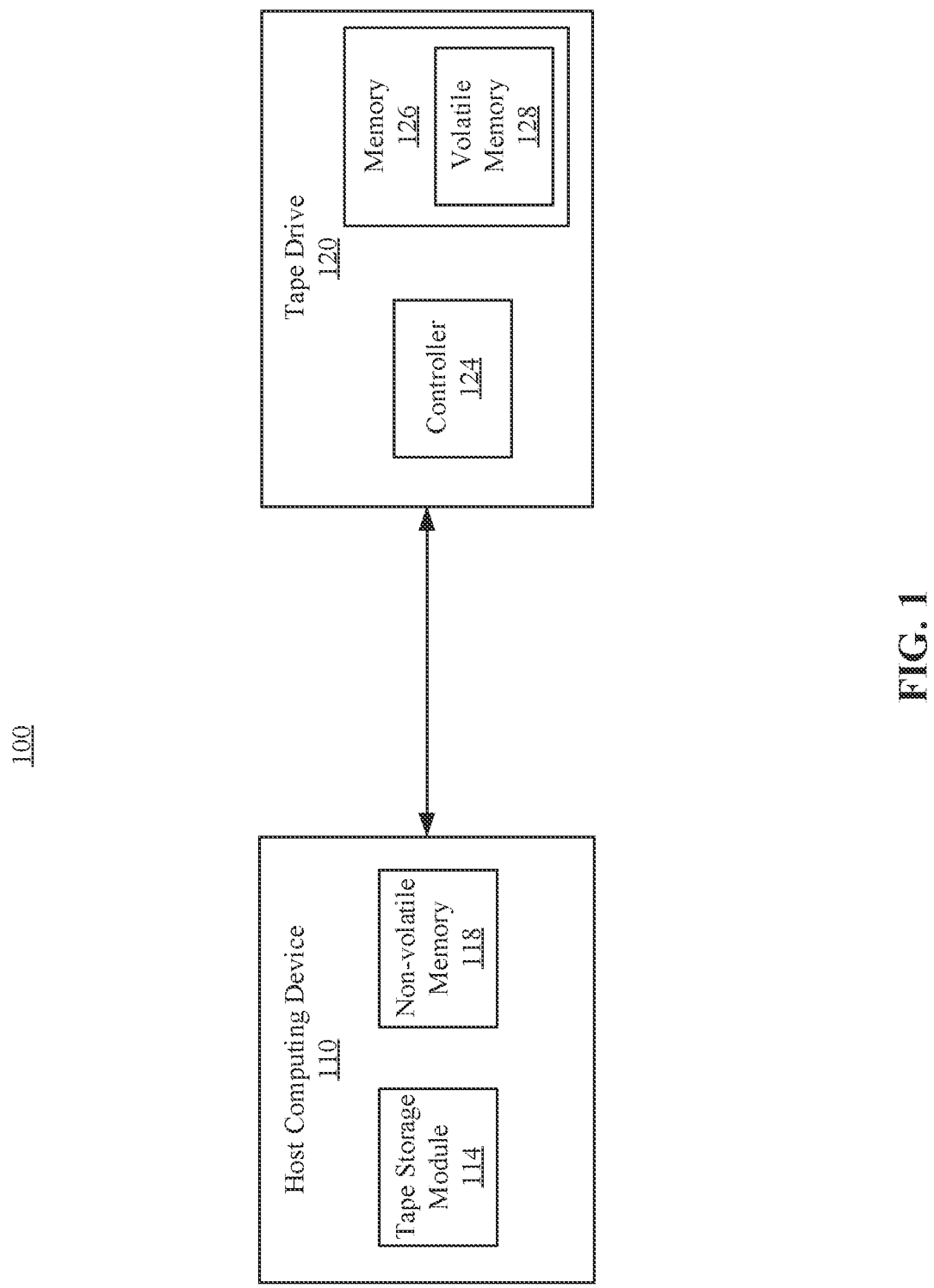
FIG. 1 depicts a tape storage system according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to improving seek time in tape storage, and more particular aspects relate to the storing of a High Resolution Tape Directory in non-volatile memory. While the present disclosure is not necessarily limited to such applications, various aspects of the disclosure may be appreciated through a discussion of various examples using this context.

Linear tape-open (LTO) tape drives and IBM enterprise tape drives (TS11xx) are called linear tape drives. A linear tape drive allocates data on a tape in a longitudinal direction and records the data from the beginning of the tape to the end, then shifts the position slightly in the lateral direction of the tape, and then records data to the tape in the opposite longitudinal direction. The linear tape drive repeats this reciprocating operation several times with shifting in the lateral direction of the tape. The position where all the area of the tape has been written is determined as the logical end of the tape.

In this operation, a linear line of data from the beginning to end of the tape or from the end to beginning is called a Wrap. The number of Wraps depends on type of cartridge and cartridge formats. In the cases of LTO and TS11xx tape drives, the number of Wraps ranges from 48 to 208. The data write area of a tape is divided into four sections in the lateral direction, in each of which one-fourth of the Wraps is included. Each divided section is called a Data Band. The tape drive is recognized as a streaming device by a computer connected to the tape drive and is generally operated via a Small Computer System Interface (SCSI) command set.

The data on the tape drive is broadly classified logically into real data (record) and separator (file mark: FM). The tape drive assigns numbers sequentially to the logical data (records and FMs) written from the beginning. The tape drive holds current position information, which can be retrieved by a ReadPosition command. The tape drive provides commands for changing the current position (seek commands). Using the Locate, Space, and Rewind commands, the current position can be changed. Upon receipt of a seek command, LTO and TS11xx tape drives wind up the tape so as to position the head of the tape drive to a position of the tape where recording has been performed. Upon receipt of a Read command, the tape drive reads the logical data at the current position, transmits the data to the computer, and then increments the current position. Upon receipt of a Write command, the tape drive writes the logical data received from the computer to the current position, increments the current position, and then sets the current position as the end of logical data (EOD). In other words, upon receipt of a Write command, the tape drive writes the logical data received from the computer to the current position, increases increments the current position by 1, and then invalidates the data succeeding the increased current position.

In response to receiving a seek command, the tape drive cannot simply move to the physical position of the target record. For example, when storing 10 TB of data as 128 KB records, 40,000,000 records are necessary, and it is impossible to record the physical positions of all the records. In addition, unlike hard disk drives (HDDs), it is generally possible for a tape device to modify the record length of each record. For this reason, the physical positions cannot be determined with a simple calculation formula.

LTO drives implement a standardized mechanism called Tape Directory (TD), which allows estimation of physical positions, and writes the TD into a non-volatile memory in the cartridge as appropriate. In the case of LTO, a TD stores the number of the records and the number of the FMs written in the first half of each Wrap and the number of the records and the number of the FMs written in the second half of each Wrap. In the case of TS11xx, a TD stores the number of the records and the number of the FMs written in each Wrap. By consulting the TD, it is possible to know the Wrap and an area thereof where the target record is present.

A seek operation includes moving the tape to the beginning of the area where the target record is present and reading records from the beginning of the area until the target record is reached. Information about the area read during the seek operation is accumulated in the volatile memory of the tape drive. The area information accumulated in this operation is composed of the number of the records and the number of the FMs written in the areas which are resulted by dividing each Wrap by a number from 32 to 128. This area information table is called High Resolution Tape Directory (HRTD).

TS11xx drives store the HRTD in a management area of the tape when writing records. However, in the case of an LTO drive, as the use of the management area of a tape is strictly defined by the LTO format specification, it is not allowed to store the HRTD on the tape. Therefore, the LTO drive discards the HRTD in the volatile memory of the drive when unloading the tape cartridge. For this reason, compared to TS11xx tape drives, LTO tape drives are generally slower in seeking a record that has not accessed since the cartridge has been inserted.

Methods, systems, and computer program products are described herein for storing HRTD data in an off-tape non-volatile memory when a tape cartridge is unloaded from a tape drive. In embodiments, a host computing device or a tape library reads the HRTD from the tape drive and stores it before unloading the tape cartridge. Then, when the tape cartridge is subsequently inserted into a tape drive, the host computing device or the tape library transmits the stored HRTD to the tape drive to allow the tape drive to use the previously produced HRTD data for subsequent seeking. Thus, embodiments may be particularly beneficial for tape drives, such as LTO tape drives, that would otherwise not have access to the HRTD as it is typically discarded upon the tape cartridge being unloaded from the tape drive. For example, it may provide an LTO drive with the ability to seek to a record that has not been accessed since the tape cartridge was inserted at a speed equivalent to that of TS11xx drives. Additionally, embodiments may also provide a benefit to other types of tape drives by providing an alternative storage location for the HRTD, thus freeing up storage for other uses.

A command for retrieving an HRTD from a tape drive and a command for sending a stored HRTD to a tape drive may be provided. In some embodiments, the commands may be provided by defining a new page in existing SCSI commands such as ModeSense and ModeSelect, or commands like ReadBuffer and Write Buffer. Alternatively, the commands may be provided by defining new vendor-unique commands. In the present disclosure, a command called GET_HRTD is used to refer to a command to retrieve an HRTD from a tape drive and a command called SET_HRTD is used to refer to a command to send a stored HRTD to a tape drive.

The HRTD for a tape cartridge could become invalid if a tape is subsequently modified and the HRTD is not updated. In some embodiments, the tape drive additionally provides verification data based on tape specific information at the time of providing the HRTD that can be used to verify that the HRTD is valid. For example, the tape drive may generate a hash code using the tape specific information and provide the hash code with the HRTD. Tape specific information may include information stored in a non-volatile memory of a tape cartridge that describes the tape. For example, tape specific information may include an identifier such as a tape serial number that is created by the manufacturer and a write pass value indicating the number of writes that have been tried on the tape.

The hash code may be generated using any suitable hashing algorithm. The verification data may be used to prevent an incorrect HRTD from being used when the tape has been modified since the HRTD was created. In some embodiments, the host computing device or tape library may provide the verification data to the tape drive with the HRTD and the tape drive may check the verification data with the tape specific information of the loaded tape cartridge. For example, the tape drive may calculate a new hash code based on the tape specific information (tape serial, write pass) and compare the new hash code to the hash code received from the host computing device or tape library. If the tape serial number does not match or if the tape has been written to by another application to cause the write pass count to increase, the hash codes would not match, indicating that the HRTD is invalid.

In embodiments where the HRTD is stored by a tape library, the HRTD may be maintained as long as the corresponding tape cartridge remains in the tape library. However, storage space in the tape library may be limited such that HRTD data may need to be discarded at some point to free up storage space. When the tape cartridge is removed from the tape library, the tape library may be configured to handle the corresponding HRTD in different ways.

In some embodiments, the HRTD is saved for a certain period of time after removal of the corresponding tape cartridge from the tape library. For example, the tape library may discard the HRTD after a specified period of time has elapsed since the corresponding tape cartridge was removed from the tape library. Alternatively, the tape library may discard the HRTD based on the remaining free storage capacity in the non-volatile memory. For example, the tape library may discard the HRTD if the corresponding tape cartridge has been removed from the tape library and the remaining free storage capacity is below a threshold value. In some embodiments, a combination of the time elapsed since the corresponding tape cartridge was removed and the remaining storage capacity may be used. For example, the tape library may discard the HRTD if the remaining free storage capacity is below a threshold and a specified period of time has elapsed since the corresponding tape cartridge was removed. To determine the period of time that has elapsed since a tape cartridge was removed, the tape library may generate a time stamp when the tape cartridge is removed and store it in association with the corresponding HRTD.

In some embodiments, the tape library may export the HRTD when the corresponding tape cartridge is removed from the tape library. For example, the tape library may be configured to communicate the HRTD to a host computing device in communication with the tape library. The tape library may be further configured to import the HRTD when the corresponding tape cartridge is subsequently inserted. For example, the tape library may communicate a request for the HRTD to the host computing device when the corresponding tape cartridge is inserted into the tape library.

In some embodiments, the tape library may simply discard the HRTD when the corresponding tape cartridge is removed. While this frees up storage space on the tape library, the benefits of retaining the HRTD may be lost if the corresponding tape cartridge is subsequently inserted into the tape library.

Referring now to FIG. 1, a tape storage system 100 is depicted according to embodiments of the present disclosure. Tape storage system 100 includes a host computing device 110 and a tape drive 120. The host computing device 110 may be communicatively coupled to tape drive 120 via one or more interfaces. In some embodiments, host computing device 110 may communicate with tape drive 120 over one or more networks.

Figure 6:
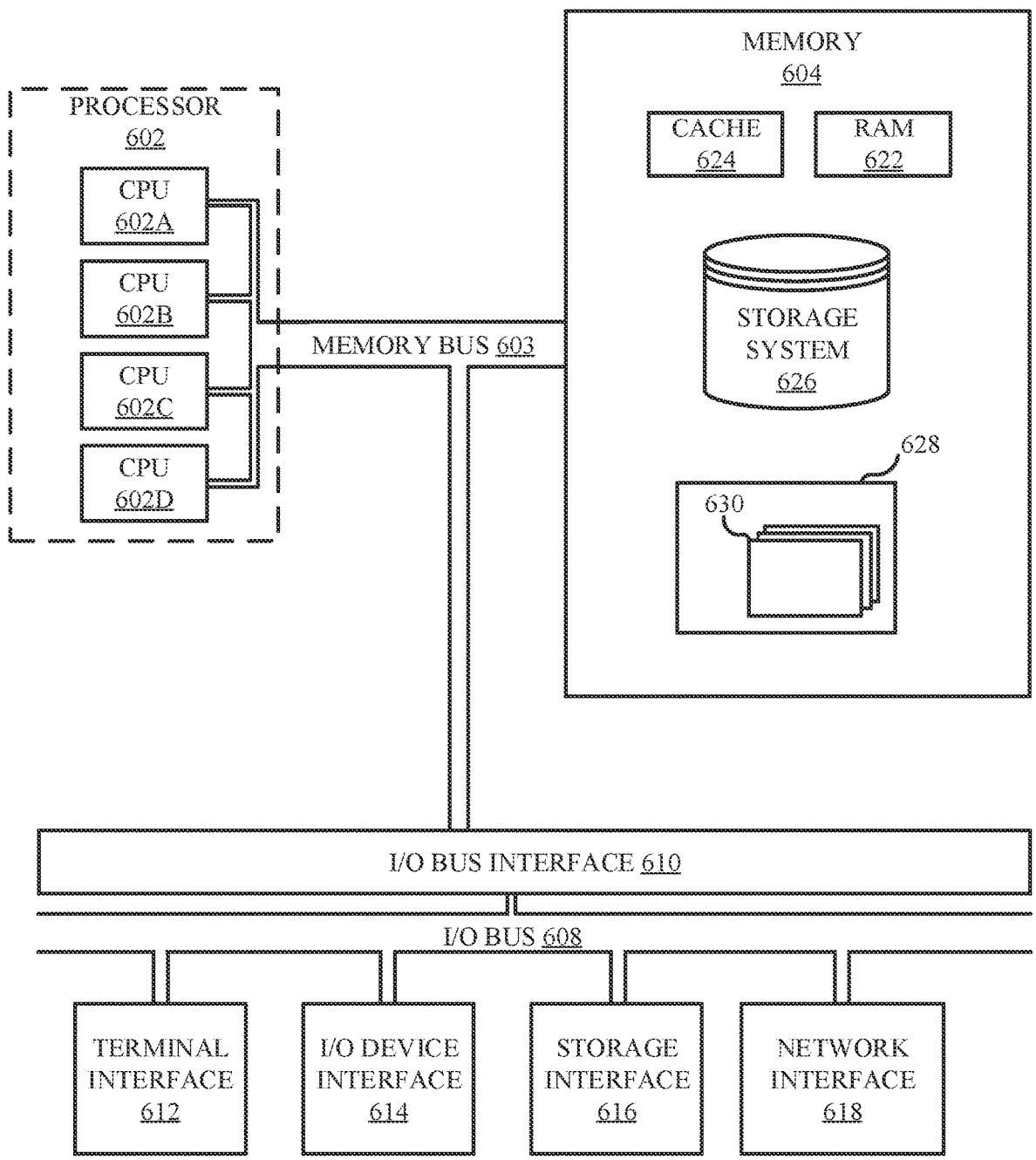
FIG. 6 depicts a high-level block diagram of an example computer system in accordance with embodiments of the present disclosure.

Host computing device 110 may be any suitable computing device such as, for example, computer system 601 described in reference to FIG. 6. Host computing device 110 includes a tape storage module 114 and nonvolatile memory 118. Tape storage module 114 may be any combination of hardware and software components configured to communicate with tape drive 120. For example, tape storage module 114 may include program instructions executable by a processor for communicating commands to tape drive 120 and processing information received from tape drive 120. Host computing device 110 further includes a non-volatile memory 118. Non-volatile memory 118 may be any suitable non-volatile memory component that retains information after having been power cycled. As described herein, non-volatile memory 118 may store HRTD data received from tape drive 120.

Tape drive 120 may be any type of suitable tape drive. As mentioned previously, aspects of the present disclosure may be particularly beneficial for tape drives, such as LTO tape drives, that are configured to discard HRTD data when a tape cartridge is ejected, without storing the data in a non-volatile memory. Tape drive 120 may include a controller 124. Controller 124 may be or include a processor and/or any logic for controlling any subsystem of tape drive 120. For example, the controller 124 typically controls head functions such as servo following, data writing, data reading, etc. The controller 124 may operate under logic known in the art, as well as any logic disclosed herein, and thus may be considered as a processor for any of the descriptions of tape drives included herein, in various embodiments. The controller 124 may be coupled to a memory 126 of any known type, which may store instructions executable by the controller 124. Moreover, the controller 124 may be configured and/or programmable to perform or control some or all of the methodology presented herein. Thus, the controller 124 may be considered to be configured to perform various operations by way of logic programmed into one or more chips, modules, and/or blocks; software, firmware, and/or other instructions being available to one or more processors; etc., and combinations thereof.

Memory 126 may be a combination of one or more memory devices. Memory 126 includes volatile memory 128. Controller 124 may be configured to store information in volatile memory 128 related to a tape cartridge that is loaded in tape drive 120. For example, the controller may read a TD from the cartridge memory of the loaded tape cartridge and store the TD in volatile memory 128. Further, the controller may use the TD in volatile memory 128 to perform seek commands and may store physical positions of records as an HRTD in volatile memory 128. Additionally, the controller may read tape specific information from the cartridge memory and use the information to generate verification data as described herein.

Figure 2:
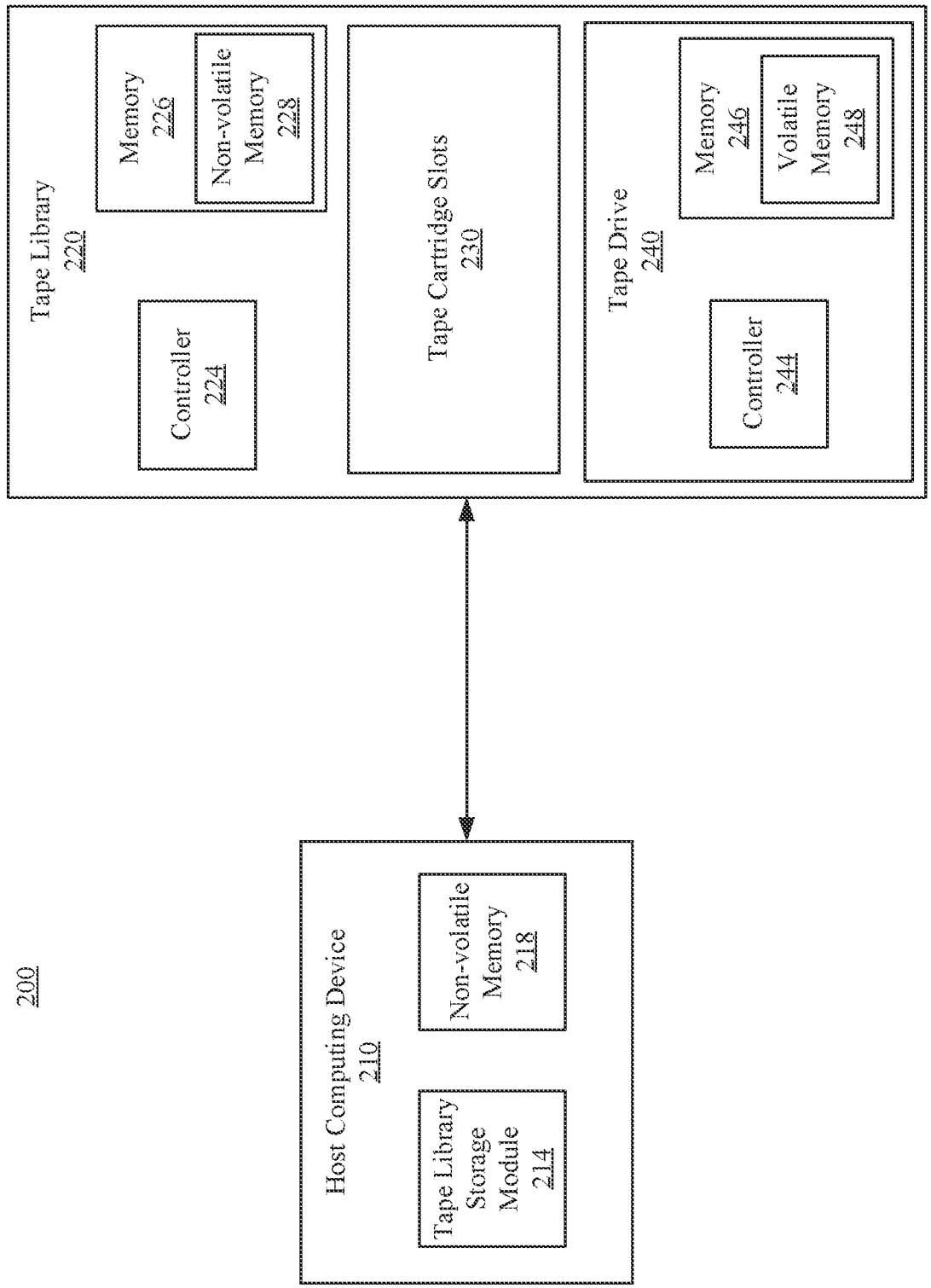
FIG. 2 depicts a second tape storage environment according to embodiments of the present disclosure.

Referring now to FIG. 2, a second tape storage environment 200 is depicted according to embodiments of the present disclosure. Environment 200 includes a host computing device 210 and a tape library 220. The host computing device 210 may be communicatively coupled to tape library 220 via one or more interfaces. In some embodiments, host computing device 210 may communicate with tape library 220 over one or more networks.

Host computing device 210 may be any suitable computing device such as, for example, computer system 601 described in reference to FIG. 6. Host computing device 210 includes a tape library storage module 214 and nonvolatile memory 218. Tape library storage module 214 may be any combination of hardware and software components configured to communicate with tape library 220. For example, tape library storage module 214 may include program instructions executable by a processor for communicating commands to tape library 220 and processing information received from a tape library 220. Host computing device 210 further includes a non-volatile memory 218. Non-volatile memory 218 may be any suitable non-volatile memory component that retains information after having been power cycled. As described herein, non-volatile memory 218 may store HRTD data exported from Tape Library 220.

Tape library 220 includes controller 224, memory 226, tape cartridge slots 230, and tape drive 240. Controller 224 may be or include a processor and/or any logic for controlling any subsystem of tape library 220. For example, the controller 224 may control the transfer of tape cartridges between tape cartridge slots 230 and tape drive 240. The controller 124 may operate under logic known in the art, as well as any logic disclosed herein, and thus may be considered as a processor for any of the descriptions of tape drives included herein, in various embodiments. The controller 224 may be coupled to a memory 226 of any known type, which may store instructions executable by the controller 224. Moreover, the controller 224 may be configured and/or programmable to perform or control some or all of the methodology presented herein. Thus, the controller 224 may be considered to be configured to perform various operations by way of logic programmed into one or more chips, modules, and/or blocks; software, firmware, and/or other instructions being available to one or more processors; etc., and combinations thereof.

Memory 226 includes a non-volatile memory 228. Non-volatile memory 228 may be any suitable non-volatile memory component that retains information after having been power cycled. As described herein, non-volatile memory 228 may store HRTD data received from tape drive 240.

Tape cartridge slots 230 may include any number of slots for holding tape cartridges within tape library 220. Tape library 220 may be configured to automatically remove a tape cartridge from one of the tape cartridge slots 230 and insert it into tape drive 240. Tape library 220 may be further configured to eject a tape cartridge from tape drive 240 and insert it into one of the tape cartridge slots 230.

Tape drive 240 may include a controller 244. Controller 244 may be or include a processor and/or any logic for controlling any subsystem of tape drive 240. For example, the controller 244 typically controls head functions such as servo following, data writing, data reading, etc. The controller 244 may operate under logic known in the art, as well as any logic disclosed herein, and thus may be considered as a processor for any of the descriptions of tape drives included herein, in various embodiments. The controller 244 may be coupled to a memory 246 of any known type, which may store instructions executable by the controller 244. Moreover, the controller 244 may be configured and/or programmable to perform or control some or all of the methodology presented herein. Thus, the controller 244 may be considered to be configured to perform various operations by way of logic programmed into one or more chips, modules, and/or blocks; software, firmware, and/or other instructions being available to one or more processors; etc., and combinations thereof.

Memory 246 may be a combination of one or more memory devices. Memory 246 includes volatile memory 248. Controller 244 may be configured to store information in volatile memory 248 related to a tape cartridge that is loaded in tape drive 240. For example, the controller may read TD from the cartridge memory of the loaded tape cartridge and store the TD in volatile memory 248. Further, the controller may use the TD in volatile memory 248 to perform seek commands and may store physical positions of records as an HRTD in volatile memory 248. Additionally, the controller may read tape specific information from the cartridge memory and use the information to generate verification data as described herein. While tape library 220 is depicted as having a single tape drive, the tape library could have any number of tape drives.

Figure 3:
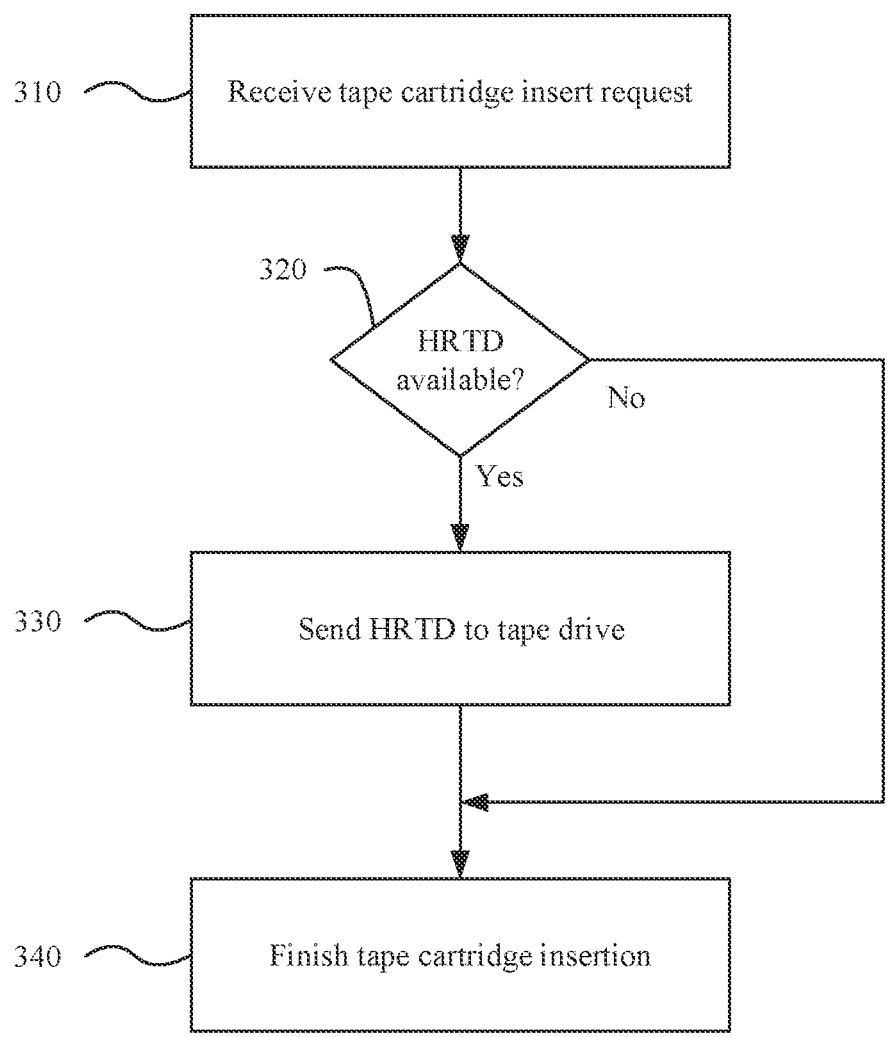
FIG. 3 depicts a flowchart of a method for handling the insertion of a tape cartridge in a tape drive according to embodiments of the present disclosure.

Referring now to FIG. 3, a flowchart of a method 300 for handling the insertion of a tape cartridge in a tape drive according to embodiments of the present disclosure. Some or all of method 300 may be performed by a host computing device. For example, method 300 may be performed by tape storage module 114 of host computing device 110 described in reference to FIG. 1 or tape library storage module 214 of host computing device 210 described in reference to FIG. 1. FIG. 3 will be described herein as being performed by a host computing device; however, in some embodiments, some or all of method 300 may be performed by tape library 220. For example, program instructions for performing method 300 may be included in memory 246 for execution by controller 224 in tape library 220.

At operation 310, a tape cartridge insert request is received by the host computing device. For example, the host computing device may be notified that a tape cartridge has been inserted into a tape drive. A tape cartridge insert request may occur in response to manual insertion of a tape cartridge into the tape drive by a user or by an automated process of a tape library. At operation 320, the host computing device determines whether an HRTD is stored in non-volatile memory that corresponds to the tape cartridge. In some embodiments, the host computing device searches HRTD data in a non-volatile memory on the host computing device using an identifier for the tape cartridge. The HRTD data may include a plurality of HRTDs corresponding to a plurality of tape drives. The host computing device may identify a corresponding HRTD using a tape identifier such as a serial number. In some embodiments, the host computing device searches HRTD data stored in non-volatile memory in a tape library holding the tape drive.

If, at operation 320, an HRTD corresponding to the tape cartridge is available, the HRTD is sent to the tape drive at operation 330. For example, the host computing device may read the HRTD from non-volatile memory and communicate the HRTD to the tape drive using a SET_HRTD command to store the HRTD in the volatile memory of the tape drive.

After sending the HRTD to the tape drive at operation 330, or after determining that an HRTD corresponding to the tape cartridge is not available at operation 320, the tape cartridge insertion is finished at operation 340 to allow commands to be performed on the tape.

Figure 4:
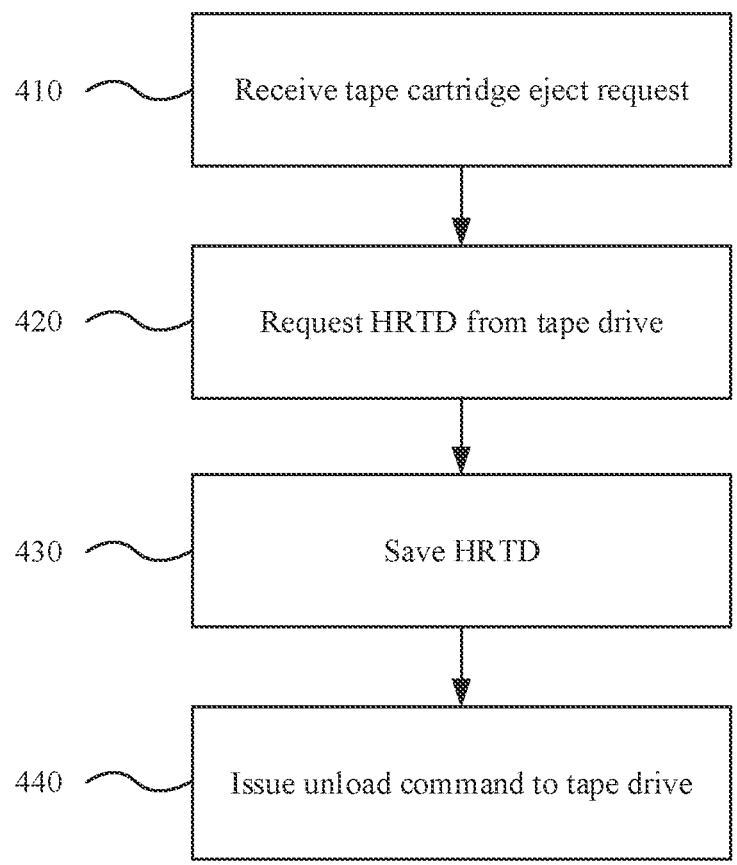
FIG. 4 depicts a flowchart of a method for handling a tape eject request is depicted according to embodiments of the present disclosure.

Referring now to FIG. 4, a flowchart of a method 400 for handling a tape eject request is depicted according to embodiments of the present disclosure. Some or all of method 400 may be performed by a host computing device. For example, method 400 may be performed by tape storage module 114 of host computing device 110 described in reference to FIG. 1 or tape library storage module 214 of host computing device 210 described in reference to FIG. 1. FIG. 4 will be described herein as being performed by a host computing device; however, in some embodiments, some or all of method 400 may be performed by tape library 220. For example, program instructions for performing method 400 may be included in memory 246 for execution by controller 224 in tape library 220.

At operation 410, a tape cartridge eject request is received by a host computing device. The eject request may occur in response to the manual action by a user or an automated action by a tape library. At operation 420, the host computing device requests the HRTD corresponding to the tape cartridge from the tape drive. For example, the host computing device may issue a GET_HRTD command to the tape drive. In response to the request, the tape drive may read the HRTD from its volatile memory and communicate it to the host computing device or tape library.

At operation 430, the host computing device saves the HRTD received from the tape drive in a non-volatile memory. In some embodiments, the non-volatile memory is on the host computing device. In some embodiments, the non-volatile memory is on a tape library holding the tape drive. The non-volatile memory may store HRTDs for a plurality of different tape cartridges. The HRTDs may be stored with an identifier such as a tape serial number to identify the corresponding tape cartridge. In some embodiments, the HRTDs are stored with verification data received from the tape drive or generated by the host computing device. At operation 440, the host computing device issues an unload command to the tape drive.

Figure 5:
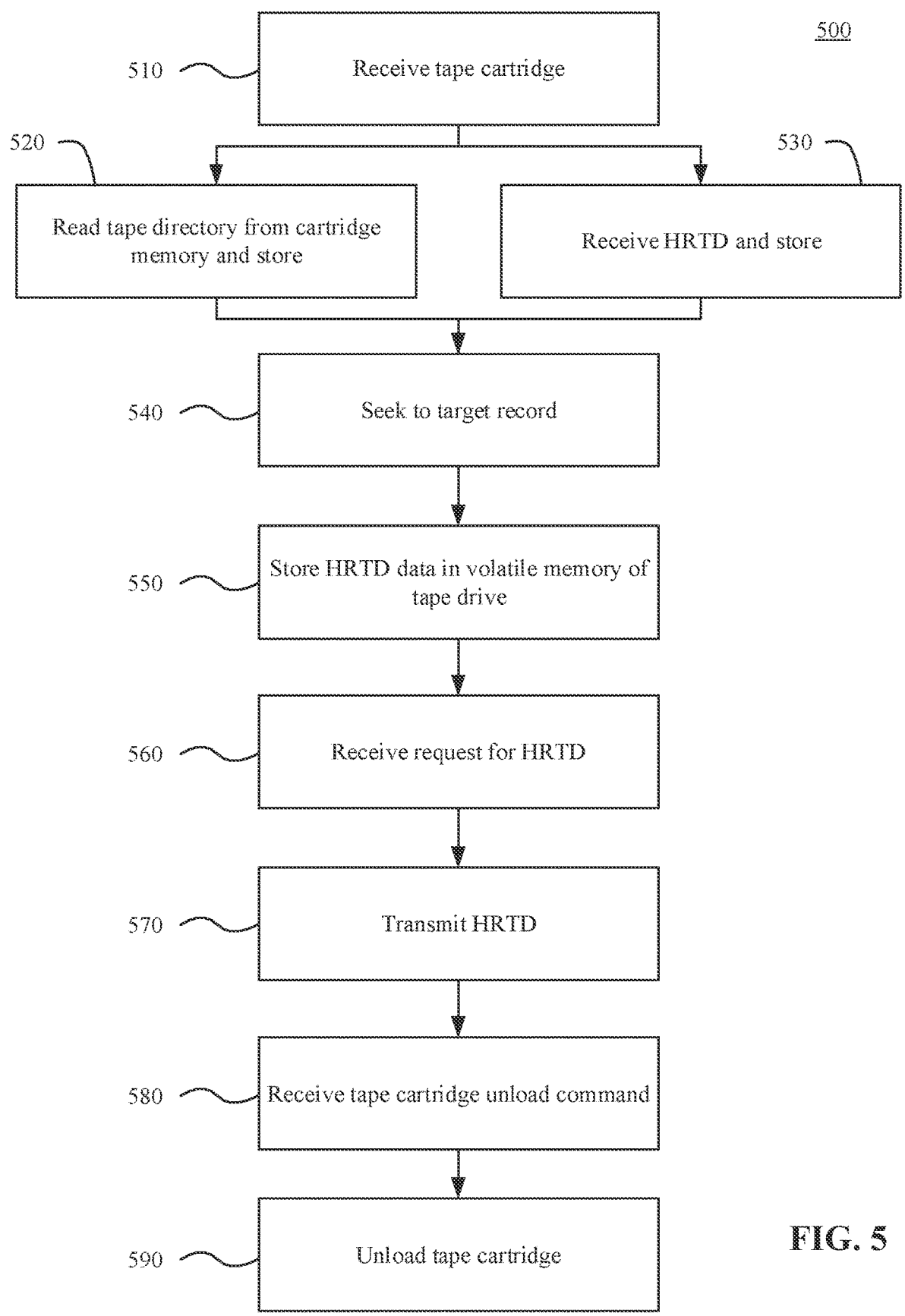
FIG. 5 depicts a method for operating a tape drive is depicted according to embodiments of the present disclosure.

Referring now to FIG. 5, a method 500 for operating a tape drive is depicted according to embodiments of the present disclosure. Method 500 may be performed by a controller of a tape drive such as controller 124 of tape drive 120 described in reference to FIG. 1 or controller 244 of tape drive 240 described in reference to FIG. 2.

At operation 510, a tape drive receives a tape cartridge. For example, a tape cartridge may be manually inserted into the tape drive by a user or a tape cartridge may be automatically inserted by a tape library. The tape drive may be configured to read a tape cartridge identifier such as a serial number from a cartridge memory of the tape cartridge and communicate the identifier to a host computing device. At operation 520, the tape drive reads a tape directory from the cartridge memory of the tape drive. The tape drive may store the tape directory in its volatile memory.

At operation 530, an HRTD is received by the tape drive and stored in its volatile memory. The HRTD may be communicated to the tape drive from a nonvolatile memory of a host computing device or tape library using, for example, a SET_HRTD command. In some embodiments, the received HRTD is accompanied by verification data such as a hash code produced using tape specific information. The tape drive may be configured to verify the hash code using tape specific information from the tape cartridge. For example, the tape drive may calculate a new hash code and determine whether it matches the received hash code. If the hash code is not verified, the HRTD may be discarded by the tape drive. If an HRTD for the tape cartridge has not previously been generated, operation 530 may not occur.

At operation 540, the tape drive seeks to a target record using the tape directory and/or the HRTD. Operation 540 may occur in response to receiving a seek command from a host computing device or a tape library. A seek operation may include moving the tape to the beginning of the area where the target record is present based on the tape directory and reading records from the beginning of the area until the target record is reached.

At operation 550, HRTD data is stored in the volatile memory of the tape drive using the physical positions of records identified during the seeking in operation 540. A new HRTD may be created if an HRTD does not already exist for the tape cartridge. Alternatively, the HRTD data may be added to an existing HRTD.

At operation 560, the tape drive receives a request for the HRTD. For example, the tape drive may receive a GET_HRTD command from a host computing device in response to request to remove the tape cartridge from the tape drive.

At operation 570, the tape drive transmits the HRTD to the host computing device or tape library for storing in a non-volatile memory. In some embodiments, the tape drive may generate verification data such as a hash code using tape specific information (e.g., tape serial, write pass) and transmit the hash code along with the HRTD.

At operation 580, a tape cartridge unload command is received by the tape drive. At operation 590, the tape cartridge is unloaded from the tape drive.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

In some embodiments, a method comprises: reading a tape directory from a cartridge memory of a tape cartridge in a first tape drive; seeking a target record using the tape directory; storing physical positions of a plurality of different records that have been read during the seeking in a volatile memory of the first tape drive as a high resolution tape directory (HRTD); communicating the HRTD stored in the volatile memory for storage in an off-tape non-volatile memory prior to unloading the tape cartridge; and in response to the tape cartridge being loaded into the tape drive, receiving the HRTD from the off-tape non-volatile memory to the second tape drive.

In some embodiments of the method, the off-tape non-volatile memory is part of a tape library. In some embodiments the method further comprises exporting the HRTD from the off-tape non-volatile memory in response to the tape cartridge being removed from the tape library. In some embodiments, the method further comprises discarding the HRTD in the off-tape non-volatile memory based on the tape cartridge being removed from the tape library. In some embodiments, the discarding is further based on a specified period of time elapsing since the tape cartridge was removed from the tape library.

In some embodiments, the off-tape non-volatile memory is part of host computing device.

In some embodiments, the method further comprises generating a hash code using tape specific information, wherein the hash code is communicated with the HRTD for storing in the off-tape non-volatile memory. In some embodiments, the hash code is received with the HRTD from the off-tape non-volatile memory, and the method further comprises verifying the hash code using tape specific information from the tape cartridge.

In some embodiments, a tape drive comprises: a memory including a volatile memory; and a controller coupled to the memory, the controller configured to perform operations comprising: reading a tape directory from a cartridge memory of a tape in a first tape drive; seeking a target record using the tape directory; storing physical positions of a plurality of different records that have been read during the seeking in the volatile memory as a high resolution tape directory (HRTD); storing the HRTD stored in the volatile memory into an off-tape non-volatile memory; and in response to the tape being loaded into a second tape drive, transmitting the HRTD from the off-tape non-volatile memory to the second tape drive.

In some embodiments, the operations further comprise generating a hash code using tape specific information, wherein the hash code is communicated with the HRTD for storage in the off-tape non-volatile memory. In some embodiments, the hash code is received with the HRTD from the off-tape non-volatile storage, and the operations further comprise verifying the hash code using tape specific information from the tape cartridge.

In some embodiments, a system comprises a memory containing program instructions; and a processor coupled to the memory, the processor configured to execute the instructions to perform operations comprising: in response to receiving a tape cartridge eject request for a tape cartridge in a tape drive, requesting a high resolution tape directory (HRTD) from a volatile memory of the tape drive; and in response to receiving the HRTD from the tape drive, storing the HRTD in a non-volatile memory. In some embodiments, the operations further comprise: receiving a tape cartridge insert request for inserting the tape cartridge into the tape drive; and sending the HRTD stored in the non-volatile memory to the tape drive. In some embodiments, a hash code is received with the HRTD from the tape drive and the hash code is stored in the non-volatile memory with the hash code.

In some embodiments, tape library comprises: a memory including a non-volatile memory; and a controller coupled to the memory, the controller configured to perform operations comprising: in response to receiving a tape cartridge eject request for a tape cartridge in a tape drive, requesting a high resolution tape directory (HRTD) from a volatile memory of the tape drive; and in response to receiving the HRTD from the tape drive, storing the HRTD in a non-volatile memory.

In some embodiments, the operations further comprise: receiving a tape cartridge insert request for inserting the tape cartridge into the tape drive; and sending the HRTD stored in the non-volatile memory to the tape drive.

In some embodiments, a hash code is received with the HRTD from the tape drive and the hash code is stored in the non-volatile memory with the hash code.

In some embodiments, the operations further comprise in response to the tape cartridge being removed from the tape library, discarding the HRTD from the non-volatile memory.

In some embodiments, the operations further comprise discarding the HRTD from the non-volatile memory in response to determining that a specified period of time has elapsed since the tape cartridge was removed from the tape library.

In some embodiments, the operations further comprise discarding the HRTD in response to the tape cartridge being removed from the tape library and determining that remaining free storage capacity in the non-volatile memory is below a threshold value.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used, and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
reading a tape directory from a cartridge memory of a tape cartridge in a first tape drive;
seeking a target record using the tape directory;
storing physical positions of a plurality of different records that have been read during the seeking in a volatile memory of the first tape drive as a high resolution tape directory (HRTD);
communicating, off of the first tape drive, the HRTD stored in the volatile memory for storage in a non-volatile memory off of the tape cartridge prior to unloading the tape cartridge; and
in response to the tape cartridge being loaded into the tape drive, receiving, by the first tape drive, the HRTD from the non-volatile memory.

2. The method of claim 1, wherein the non-volatile memory is part of a tape library.

3. The method of claim 2, further comprising exporting the HRTD from the non-volatile memory in response to the tape cartridge being removed from the tape library.

4. The method of claim 2, further comprising discarding the HRTD in the non-volatile memory based on the tape cartridge being removed from the tape library.

5. The method of claim 4, wherein the discarding is further based on a specified period of time elapsing since the tape cartridge was removed from the tape library.

6. The method of claim 1, wherein the non-volatile memory is part of host computing device.

7. The method of claim 1, further comprising generating a hash code using tape specific information, wherein the hash code is communicated with the HRTD for storing in the non-volatile memory.

8. The method of claim 7, wherein the hash code is received with the HRTD from the non-volatile memory, the method further comprising verifying the hash code using tape specific information from the tape cartridge.

9. A tape drive comprising:
a memory including a volatile memory; and
a controller coupled to the memory, the controller configured to perform operations comprising:
reading a tape directory from a cartridge memory of a tape in the tape drive;
seeking a target record using the tape directory;
storing physical positions of a plurality of different records that have been read during the seeking in the volatile memory as a high resolution tape directory (HRTD);
communicating, off of the tape drive, the HRTD stored in the volatile memory into a non-volatile memory off of the tape cartridge; and
in response to the tape being loaded into the tape drive, receiving the HRTD from the non-volatile memory.

10. The tape drive of claim 9, wherein the operations further comprise generating a hash code using tape specific information, wherein the hash code is communicated with the HRTD for storage in the non-volatile memory.

11. The tape drive of claim 10, wherein the hash code is received with the HRTD from the non-volatile memory, and wherein the operations further comprise verifying the hash code using tape specific information from the tape cartridge.

12. A system comprising:
a memory containing program instructions; and
a processor coupled to the memory, the processor configured to execute the instructions to perform operations comprising:
in response to receiving a tape cartridge eject request for a tape cartridge in a tape drive, requesting a high resolution tape directory (HRTD) from a volatile memory of the tape drive; and
in response to receiving the HRTD from the tape drive, storing the HRTD in a non-volatile memory off of the tape cartridge and the tape drive.

13. The system of claim 12, wherein the operations further comprise:
receiving a tape cartridge insert request for inserting the tape cartridge into the tape drive; and
sending the HRTD stored in the non-volatile memory to the tape drive.

14. The system of claim 12, wherein a hash code is received with the HRTD from the tape drive and the hash code is stored in the non-volatile memory with the hash code.

15. A tape library comprising:
a memory including a non-volatile memory; and
a controller coupled to the memory, the controller configured to perform operations comprising:
in response to receiving a tape cartridge eject request for a tape cartridge in a tape drive, requesting a high resolution tape directory (HRTD) from a volatile memory of the tape drive; and
in response to receiving the HRTD from the tape drive, storing the HRTD in the non-volatile memory off of the tape cartridge and the tape drive.

16. The tape library of claim 15, wherein the operations further comprise:
receiving a tape cartridge insert request for inserting the tape cartridge into the tape drive; and
sending the HRTD stored in the non-volatile memory to the tape drive.

17. The tape library of claim 15, wherein a hash code is received with the HRTD from the tape drive and the hash code is stored in the non-volatile memory with the hash code.

18. The tape library of claim 15, wherein the operations further comprise:
in response to the tape cartridge being removed from the tape library, discarding the HRTD from the non-volatile memory.

19. The tape library of claim 15, wherein the operations further comprise:
discarding the HRTD from the non-volatile memory in response to determining that a specified period of time has elapsed since the tape cartridge was removed from the tape library.

20. The tape library of claim 15, wherein the operations further comprise:
discarding the HRTD in response to the tape cartridge being removed from the tape library and determining that remaining free storage capacity in the non-volatile memory is below a threshold value.

* * * * *